(12) United States Patent
Page (10) Patent No.: US 12,492,782 B2
(45) Date of Patent: Dec. 9, 2025

(54) CUP AND SEAL SYSTEM FOR TRAILER BRAKES

(71) Applicant: Robert D Page, Portsmouth, VA (US)

(72) Inventor: Robert D Page, Portsmouth, VA (US)

( * ) Notice: Subject to any disclaimer, the term of this patent is extended or adjusted under 35 U.S.C. 154(b) by 392 days.

(21) Appl. No.: 18/117,865

(22) Filed: Mar. 6, 2023

(65) Prior Publication Data

US 2023/0279992 A1  Sep. 7, 2023

Related U.S. Application Data

(60) Provisional application No. 63/268,929, filed on Mar. 7, 2022.

(51) Int. Cl.
*B60T 1/06* (2006.01)
*F16J 15/3212* (2016.01)
*F16N 31/02* (2006.01)

(52) U.S. Cl.
CPC .............. *F16N 31/02* (2013.01); *B60T 1/067* (2013.01); *F16J 15/3212* (2013.01)

(58) Field of Classification Search
CPC ....... B60T 1/067; B60B 35/16; F16J 15/3212; F16J 15/3232; F16J 15/3244; F16J 15/164; F16N 31/02
See application file for complete search history.

(56) References Cited

U.S. PATENT DOCUMENTS

| | | | | |
|---|---|---|---|---|
| 2,280,857 A | * | 4/1942 | Saffold | F16J 15/3232 277/402 |
| 2,646,857 A | * | 7/1953 | Thomas | B60B 35/16 184/106 |
| 3,934,888 A | * | 1/1976 | Lutz | F16J 15/3244 277/568 |
| 5,649,709 A | * | 7/1997 | Munekata | F16J 15/3232 277/575 |
| 2009/0166981 A1 | * | 7/2009 | Kondo | F04B 53/143 277/549 |
| 2011/0018209 A1 | * | 1/2011 | Dahlhaus-Preussler | D06F 37/00 277/562 |
| 2020/0325989 A1 | * | 10/2020 | Mori | F16J 15/3232 |
| 2023/0279992 A1 | * | 9/2023 | Page | F16J 15/164 184/106 |

* cited by examiner

*Primary Examiner* — Thomas J Williams
(74) *Attorney, Agent, or Firm* — Barry Choobin; Patent 360

(57) ABSTRACT

A cup and seal system for trailer brake assemblies that can attach and fit inside a trailer brake at the base of an axle spindle that will catch and contain any leaked lubricants from a seal seepage or seal blowout failure. The accompanying seal is configured with the specs of an ordinary seal with an added extended lip that will fit inside the cup reservoir without friction resulting in a fail-safe system for trailers that are in-between bearing and brake maintenance services. Cups and Seals may be configured to fit different brake types and sizes, drum sizes, and spindle configurations to direct, catch and possibly expel any lubricant that would diminish the performance and/or stopping power of the trailer brake.

12 Claims, 8 Drawing Sheets

CUP AND SEAL SYSTEM FOR TRAILER BRAKES

CROSS-REFERENCE TO RELATED APPLICATIONS

This application claims priority from a U.S. Provisional Patent Appl. No. 63/268,929 filed on Mar. 7, 2022, which is incorporated herein by reference in its entirety.

FIELD OF INVENTION

The present invention relates to trailer brake seals, and more particularly, the present invention relates to a sealing system for preventing grease seal failure in trailer brake assembly.

BACKGROUND

Trailers that have electric, hydraulic, or air brakes are susceptible to premature failure due to the leakage of grease seals. Where the hub bearings must stay lubricated with grease or oil in order to roll, the internal parts of the brake, such as the magnets, pads, and the metal surfaces of the drum must stay dry in order to provide stopping power to the pulling vehicle. The only component that separates the two chambers of the hub/drum is the "grease seal", which is in constant frictional contact with the spindle onto which the hub/drum rotates. Regardless of the make or size of the brake configuration, the concept is the same. When the seal eventually wears out or the brake assembly becomes superheated, lubricants will leak onto the brake components, rendering them diminished or ruined.

In the trailer repair industry, it is quite common to see a brake and drum assembly that has been completely saturated with bearing grease that has leaked out of the seal, sometimes called "seal blow-out". On most brake/drum configurations, it does not take much seepage at all to ruin a brake because it spreads to every component as the wheel is turning. Once an electric magnet gets a slippery film on its surface, it will lose its grip on the drum face, and then the arm mechanism will not fully engage the brake shoes. The brake is now greatly diminished in its ability to stop the turning wheel, especially when under a heavy load. The grease will continue to swirl all around inside the brake until the pads are soaked and useless. Unfortunately, it does not matter how much life the pads or the magnet surfaces of the brake has left, it is often deemed unusable, and a new brake assembly needs to be installed which can be very costly. Even the most diligent trailer owners who service their wheel bearings and get new seals once a year can find themselves in a scary and dangerous situation on the road when their trailer suddenly loses braking power due to "seal blow-out".

The said problem is a long standing and unsolved problem. Although thousands of vehicles are affected per year due to grease seal failure, no satisfactory solution exists in the prior art and changing greasy brakes has become normal business.

A need is therefore appreciated for an improved sealing assembly for trailer brakes that overcomes the aforesaid drawbacks with conventional seals including seepage and outright seal failure.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a cup and seal system for trailer brakes that overcomes the problem of grease seal failure in the trailers.

In one aspect, disclosed is a cup and seal system for trailer brakes that includes a cup member and a seal member. The cup member can be installed on the stationary brake while the seal member can be affixed to the drum. The cup member and the seal member engage when the drum is mounted over the brakes.

In one aspect, disclosed are a cup and seal system for a trailer brake assembly, the trailer brake assembly comprises a backing plate and a drum, the trailer brake assembly configured to mount over a flange of an axle and a spindle, the cup and seal system comprises a cup member and a seal member. The cup member has a base plate, the base plate has stud holes, wherein position and number of the stud holes corresponds to holes in the backing plate which corresponds to studs in the flange, the base plate is hollow, and a conical frustum extends from an inner periphery of the base plate and upwards from a front face of the base plate. The seal member has a flange of a round, flat, and hollow profile, a skirt extends downwards from an outer periphery of the flange, a first grommet extends upwards from an inner periphery of the flange, and a second grommet extends downwards from the inner periphery of the flange. The first grommet and the second grommet are integral forming a single continuous structure. The cup member is configured to be mounted to the backing plate, the seal member is configured to be mounted to the drum, wherein the first grommet is configured to be received within the conical frustum of the cup member when the drum is installed. The seal member is configured to rotate with the drum, wherein the first grommet is configured to rotate within the conical frustum without any contact with the cup member. The seal member further comprises a garter spring for maintaining lip seal pressure on the spindle shaft. The first grommet and the second grommet are configured to channel a thick liquid into the cup member. The cup member comprises a reservoir for containing the thick liquid. The thick liquid is lubricant.

In one aspect, disclosed is a method for preventing brake failure, the method comprises providing a cup and seal system for a trailer brake assembly, the trailer brake assembly comprises a backing plate and a drum, the trailer brake assembly configured to mount over a flange of an axle and a spindle, the cup and seal system comprises a cup member and a seal member.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion.

Different types of trailer brakes, hubs, drums, spindles and seal devices, apparatuses, and methods are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Disclosed is a cup and seal system for trailer brakes. The disclosed cup and seal system is particularly advantageous by providing an excellent failsafe device for eliminating the risk of grease leakage which damages the components of the brake assembly. Embodiments of the present invention have been described for electric brakes, such as the widely used 12"×2", however, the disclosed cup and seal system can be adapted for different kinds of braking assemblies without departing from the scope of the present invention.

Figure 1:
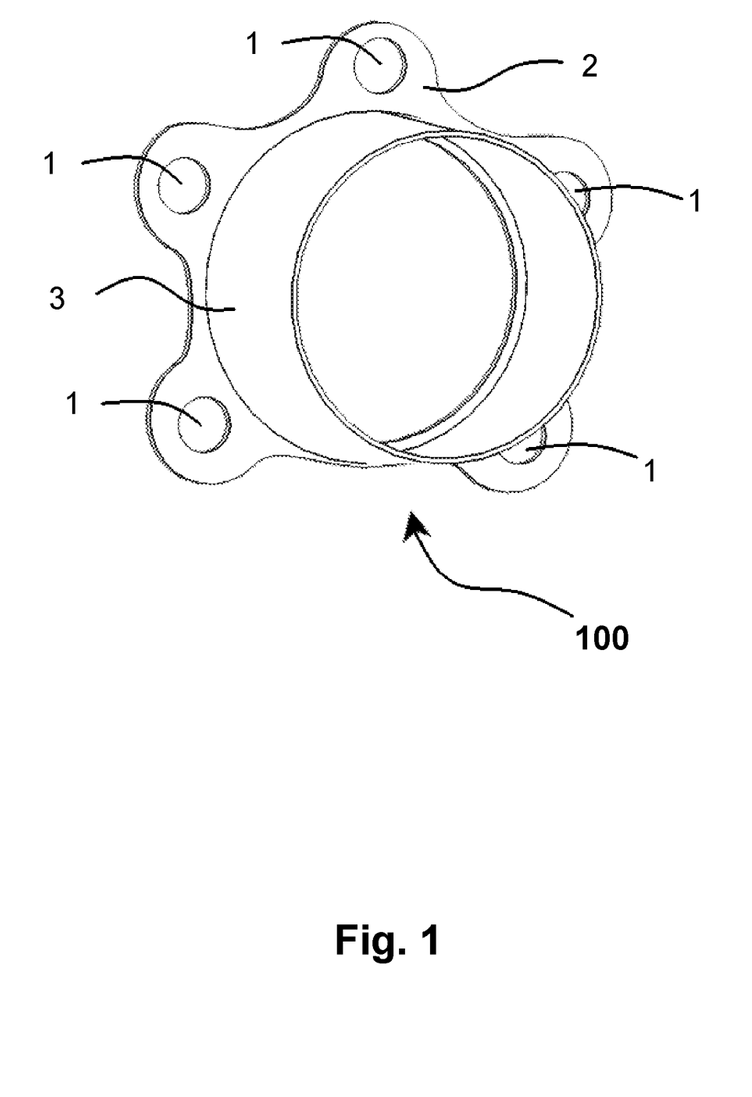
FIG. 1 is a front perspective view of the cup member for a 12"×2" electric brake assembly, according to an exemplary embodiment of the present invention.
Figure 2A:
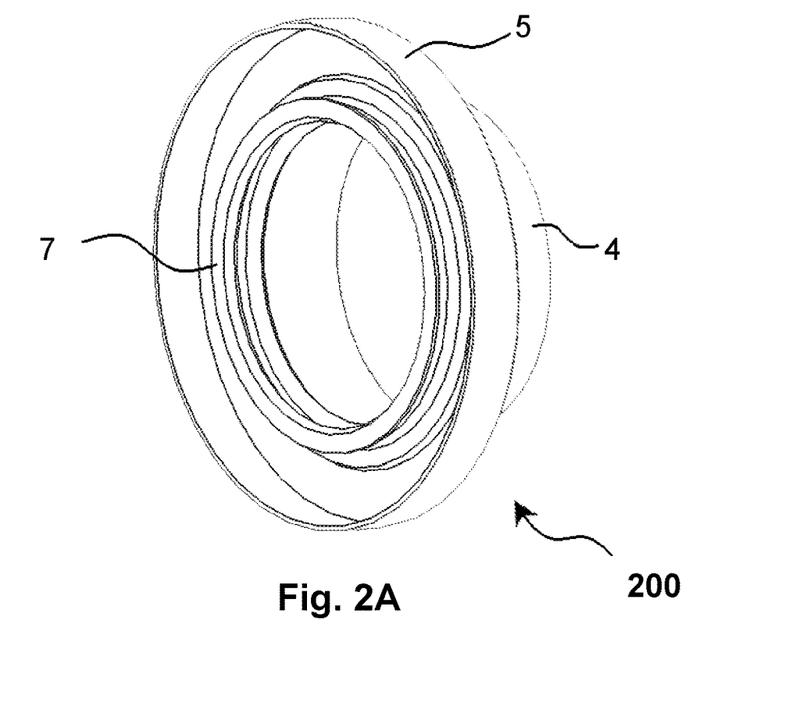
FIG. 2A is a rear angled view of the seal member for the 12"×2" electric brake assembly, according to an exemplary embodiment of the present invention.
Figure 2B:
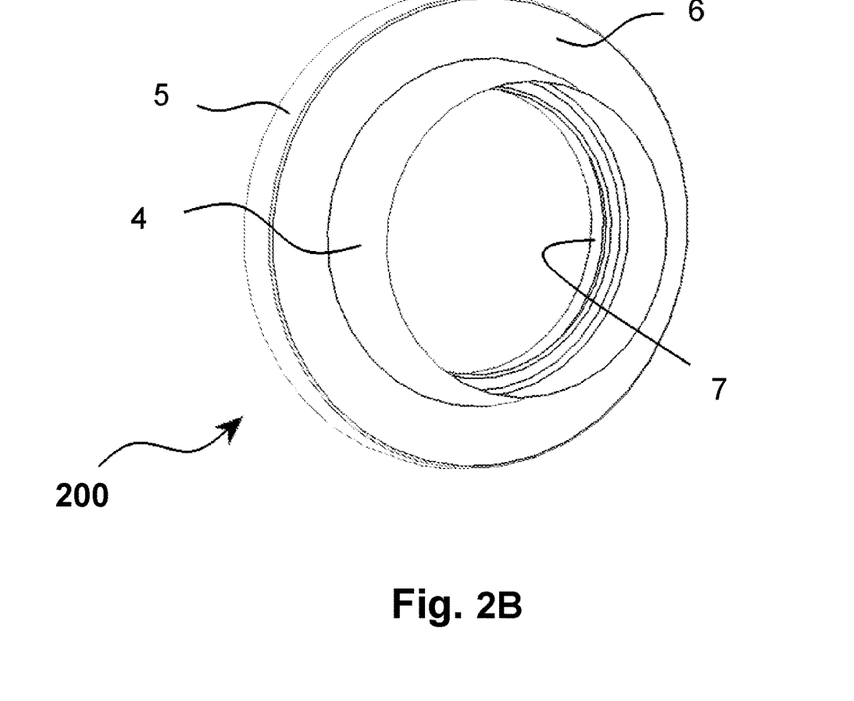
FIG. 2B is a front angled view of the seal member for the 12"×2" electric brake assembly, according to an exemplary embodiment of the present invention.

The disclosed cup and seal system includes a cup member and a seal member. FIG. 1 shows the cup member 100 and FIG. 2 shows the seal member 200. The disclosed cup member and the seal member can be installed in a standard brake assembly and do not require any significant modifications. For example, in the 12"×2" electric trailer brake, the cup member can be installed over the backing plate of the brake assembly using the standard architecture. As shown in FIG. 1, the cup member 100 has five holes 1 for the five mounting studs that are standard for the 12"×2" electric trailer brake. The disclosed cup member can be adapted to different commercially available axle flange and brake assembly architecture. Typically, a backing plate of a 12"×2" electric brake assembly for trailers has five holes, the position of which corresponds to the studs protruding from the axle flange. The brake assembly through the five holes in the backing plate is mounted over these bolts and tightened with five $\frac{3}{8}^{th}$ inches lock nuts. The cup member can be made to have the same five holes that correspond to the five holes in the backing plate. It is understood that the cup member can be adapted for different types of brake assemblies that have different number of holes in the backing plate or a different arrangement of the holes.

For installation, first the brake assembly can be mounted to the axle flange through the studs. Thereafter, the cup member can be mounted over the back plate through the studs. Then, the backplate and the cup member can be secured by fastening the nuts. The base plate 2 of the cup member 100 flush mounts with respect to the backing plate of the brake assembly, typically acting as a washer under the nuts. The base plate of the cup member shown in FIG. 1 has rounded extensions which has the holes, such a shape of the base plate of the cup member may reduce the material requirement for manufacturing the cup member and fit all distinctive backing plate shapes. The cup member lies within an empty space of the brake assembly and may not interfere with any working or moving parts in the brake assembly, such as wires, self-adjusting cables, and magnet armatures.

The cup member 100 has a base plate 2, the base plate has multiple holes 1, and a conical frustum 3 extends upwards from the front face of the base plate, the rear face of the base plate juxtaposes with the backing plate. When the brake assembly and the cup member are installed over the axle flange, the conical frustum 3 is poised at the base of the spindle creating a reservoir around the unused space of the spindle between the backing plate and the rear of the drum that is mounted on the axle. The cup member 100 may be made from stainless steel, chrome plated steel, painted steel, aluminum or other similar or suitable materials which may produce a suitable heat resistant and durable chamber.

Referring to FIGS. 2A and 2B show the seal member 200 from an angled inside perspective view. The seal member 200 may include an outer round skirt 5 that extends downwards from an outer periphery of a round and flat flange 6. A first grommet 4 extends upwards from the inner periphery of the flange 6. A second grommet 7 extends downwards from the inner periphery of the flange 6. The second grommet can be an extension of the first grommet. The skirt 5 and the flange 6 can be rigid while the first grommet and the second grommet can be flexible. The skirt 5 and the flange 6 can be integral forming a single structure.

Figure 3A:
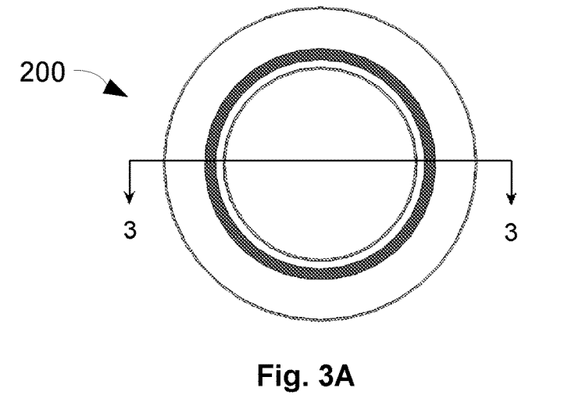
FIG. 3A is a top view of the seal member for the 12"×2" electric brake assembly, according to an exemplary embodiment of the present invention.
Figure 3B:
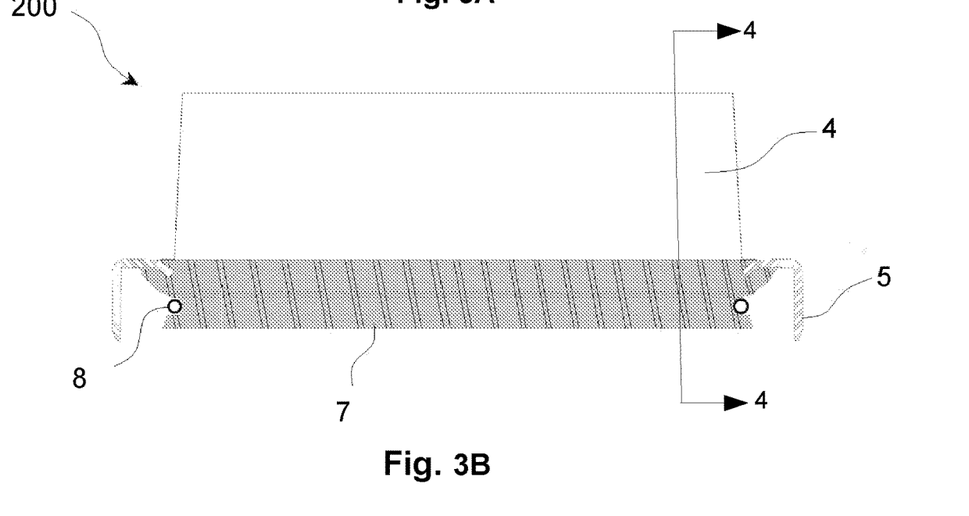
FIG. 3B is a cross sectional view taken along line 3-3 of FIG. 3A, according to an exemplary embodiment of the present invention.
Figure 3C:
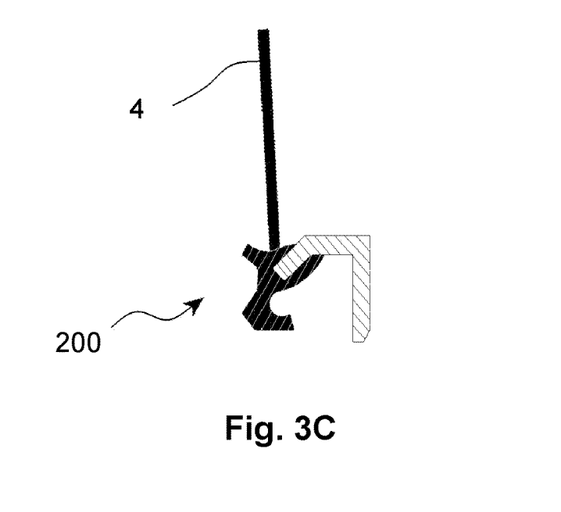
FIG. 3C is a cross sectional view taken along the line 4-4 of FIG. 3B, according to an exemplary embodiment of the present invention.

FIG. 3A shows a top view of the seal member 200 with the first grommet 4 that can fit into a drum of a 12"×2" electric trailer brake drum. FIG. 3B is a cross section view of the seal member 200 shown in FIG. 3A taken along line 3-3, wherein the first grommet has been added to the specs of a common seal consisting of the skirt 5, the second grommet 7 and a garter spring 8 that assists the seal member with sealing strength against the spindle. FIG. 3C shows another cross-sectional view of a profile of the seal member 200 showing where the first grommet 4 may be added as a continuous part of the rubber-like flexible member, which is commonly made up of, but not limited to, materials like nitrile, silicone and polyacrylate and is bonded to the metal part by chemical adhesive agents. It is common for seals to have protruding extended lips in other industries, such as automotive transmissions, or AC compressors. The first grommet 4 of the current embodiment of the invention for the 12"×2" size brake will extend inside the cup member 100 with sufficient tolerance room to overlap without any contact when the two entities are mated in their prospective positions.

The seal member is installed into a Hub/Drum after the bearings have been properly serviced and lubricated. The outer round skirt 5 is driven into the drum evenly until the outer face of the flange 6, shown in FIG. 2B, is flush with the hub housing ring which is parallel with the inner drum surface. The first grommet 4 is now extended above the inner drum surface while the second grommet 7 will fit snugly and sealably around the spindle. This part of grommet 7 will serve to keep the lubricating fluids in the system while keeping contaminants out and can have additional features such as a "wiper lip" and a garter spring to help in this regard. The garter spring circumscribes an outer surface of the second grommet and can be retained within a continuous indentation in wall of the second grommet that extends around the outer surface of the second grommet near the outer periphery. The second grommet 7 is in direct physical contact with the "seal ride area" of the spindle where it rides on a thin layer of lubricant. As with all oil seals, lubricant is expected to ooze slightly from this area to keep the rubber from overheating, but in the case of trailer brakes, it is the heat from the brakes themselves that hastens seal failure, among other factors.

When the Hub/Drum is fully seated in its standard position on the spindle, the extension of grommet 4, (which is physically one continuous part of grommet 7), will protrude into the cup member providing an overlap. As the cup is stationary in its position at the base of the spindle, the drum, which is a part of the tire and wheel assembly, will be rotating as the trailer is pulled, which will cause grommet 4 to rotate inside of the cup without the two members touching each other, and thus causing no friction. In the event of seepage, the extension of the first grommet 4 will provide the conveyance of any escaped lubricant from the inner contact area of the spindle into the cup member, where it will be contained instead of broadcast spread. This will provide a failsafe for trailers that are in-between bearing and brake maintenance services. Sufficient room inside the cup member will be more than adequate to capture and contain any normal seal failure, and additional features such as extra reservoirs and overflow tubes may be used. In the present invention, this outer extended lip may be incorporated at the manufacturing level to any of the multiple size and configurations of current grease seals with the appropriate size and shape necessary for that size brake, drum and spindle that will fit the corresponding cup for that brake size.

Figure 4A:
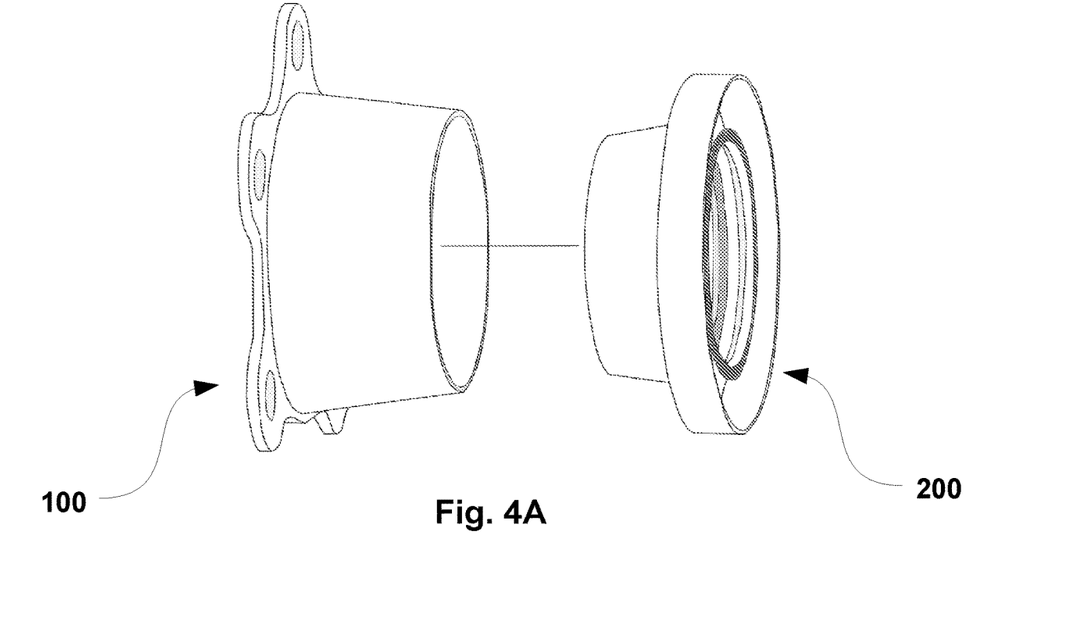
FIG. 4A is a slightly angled view of the cup member and the seal member shown separately, according to an exemplary embodiment of the present invention.
Figure 4B:
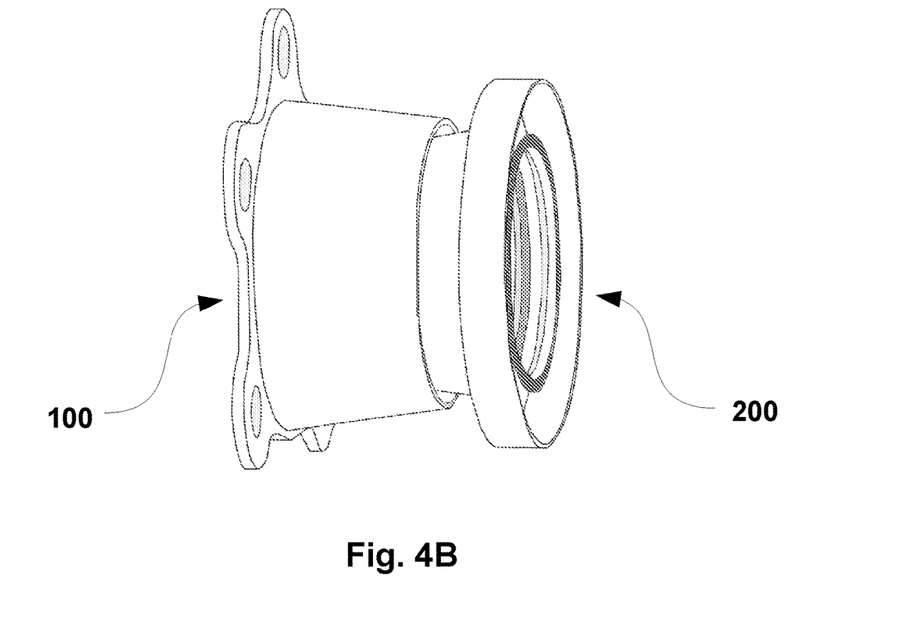
FIG. 4B illustrates coupling of the seal member inside the cup member, according to an exemplary embodiment of the present invention.

FIG. 4A shows the cup member 100 and the seal member 200 as they would appear just before mating. With the cup affixed to the backplate of the 12"×2" brake assembly and the seal member driven into the hub-drum after packing the bearings with grease, the seal member engages with the cup member when the drum is slid onto the spindle and seated into its position. FIG. 4B depicts the cup member and seal member in their approximate mated position after the drum has been properly installed, with sufficient room tolerance for imperfect seal installments. The protrusion of the extended lip of the grommet into the cup member creates the friction-less overlap necessary to ensure no lubricants escape into the brake if, and/or when the seal fails. Any lubricant seepage that leaks from the inner seal will trickle out from the center of the lip, make its way down to the lip edge, and through centrifugal force, fall or be flung into the cup member where it will either gravity feed as a liquid, or land, collect, and push further into the cup member as it heats and cools. The act of containing the lubricant has immense value because it doesn't take much seepage to render a brake useless in its stopping power.

Figure 5:
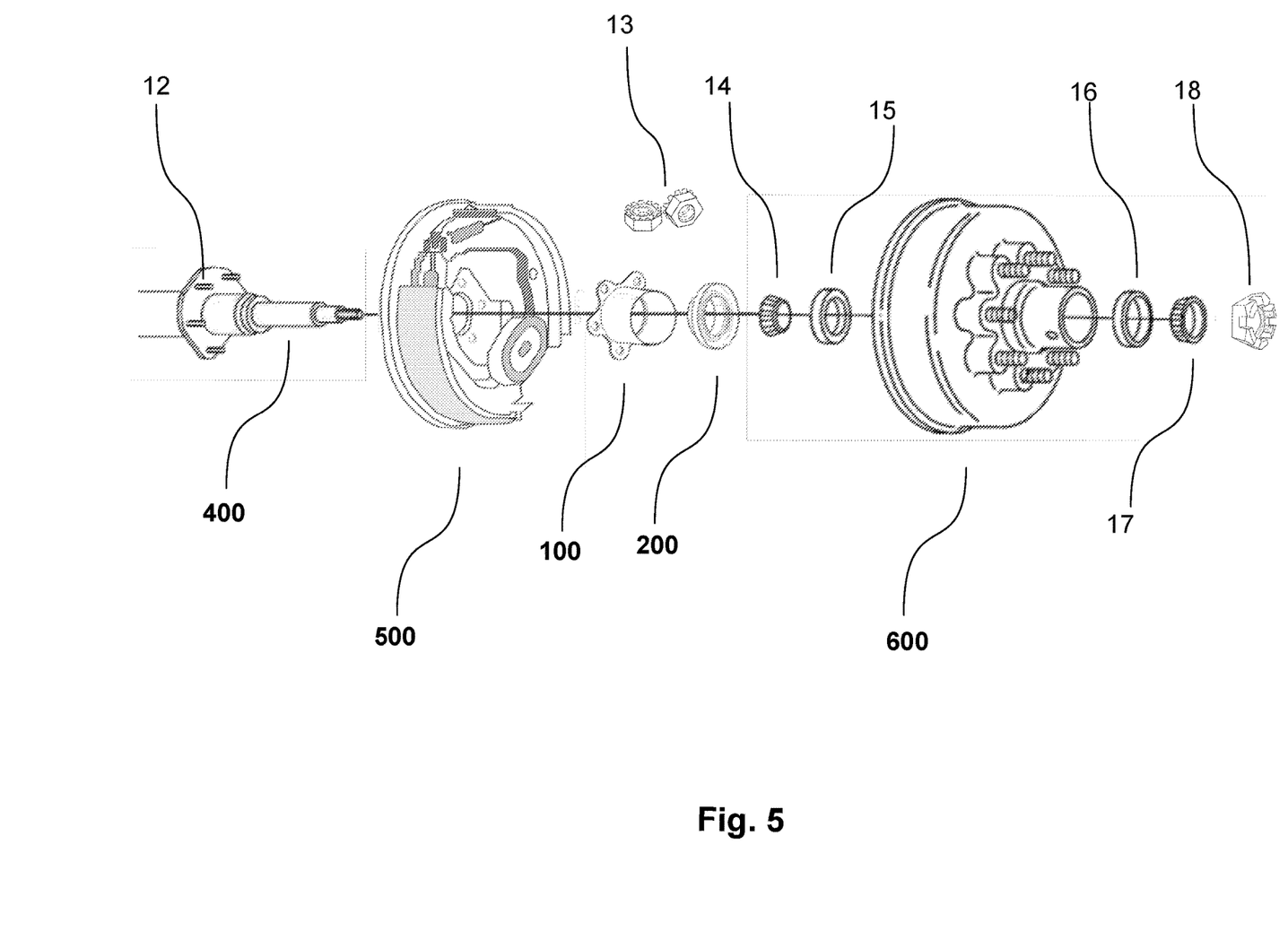
FIG. 5 illustrates an exploded view of the orientation of the cup member and seal member between the spindle 400 and 12"×2" electric brake assembly, and the 12" drum (600), according to an exemplary embodiment of the present invention.

FIG. 5 is an exploded perspective view of a 12"×2" brake and drum assembly with the disclosed cup and seal system. The backing plate 500 mounts to the axle spindle 400 via the five studs 12, and the cup member 100 will go on the studs as well and be tightened with the nuts 13. The inner bearing 14, inner race 15, outer race 16, and outer bearing 17 are installed into the hub-drum 600 with a lubricant. Seal member 200 then drives into the drum flush with the drum body. The drum assembly slides over the brake assembly onto the spindle until the bearings seat into their proper position and are tightened with the axle nut.

After all the pieces are together on the spindle, the brakes are concealed by the drums and tires. Trailer Bearings and brakes must be serviced preemptively unlike a car or truck because there is no forewarning of failure, and it must be taken all apart to investigate the parts. In the current invention, the cup member stands ready at the base of each spindle as the seal extension spins just inside the cup and nothing will happen until and unless there is a seepage.

Figure 6:
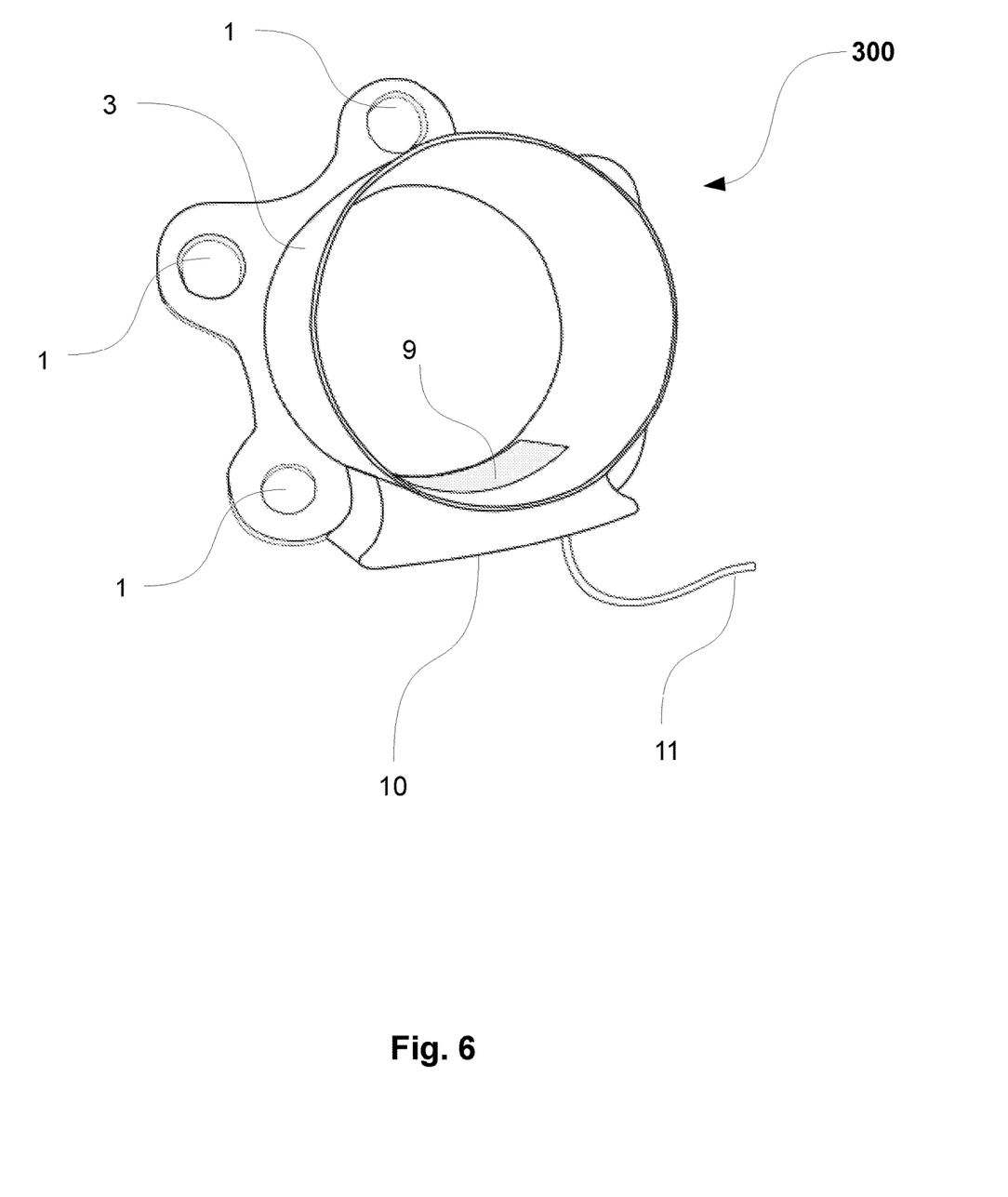
FIG. 6 shows an implementation of the cup member, according to an exemplary embodiment of the present invention.

The cup member can be adapted for different types of backing plates. For example, shown in FIG. 6 is an example of a cup member 300 for the 12"×2" electric trailer brake assembly with additional reservoir room that could catch and trap additional lubricant that would fall through the opening 9. Although the cup member 100 has ample grease room for most would-be seal failures, the cup member 300 is an example of an innovation possible for creating an overflow chamber 10 for oil-bath drums which may expel more lubricant at a faster rate than grease. Aside from being able to collect and hold more lubricant, the additional reservoir could be a good place to attach a hose 11 that could lead to an overflow hole in the back of the brake to the outside of the assembly, which could also serve as a failure indicator. Also, envisioned are leak detection devices that can alert the driver of a "blown seal" via a Bluetooth monitoring system.

Figure 7:
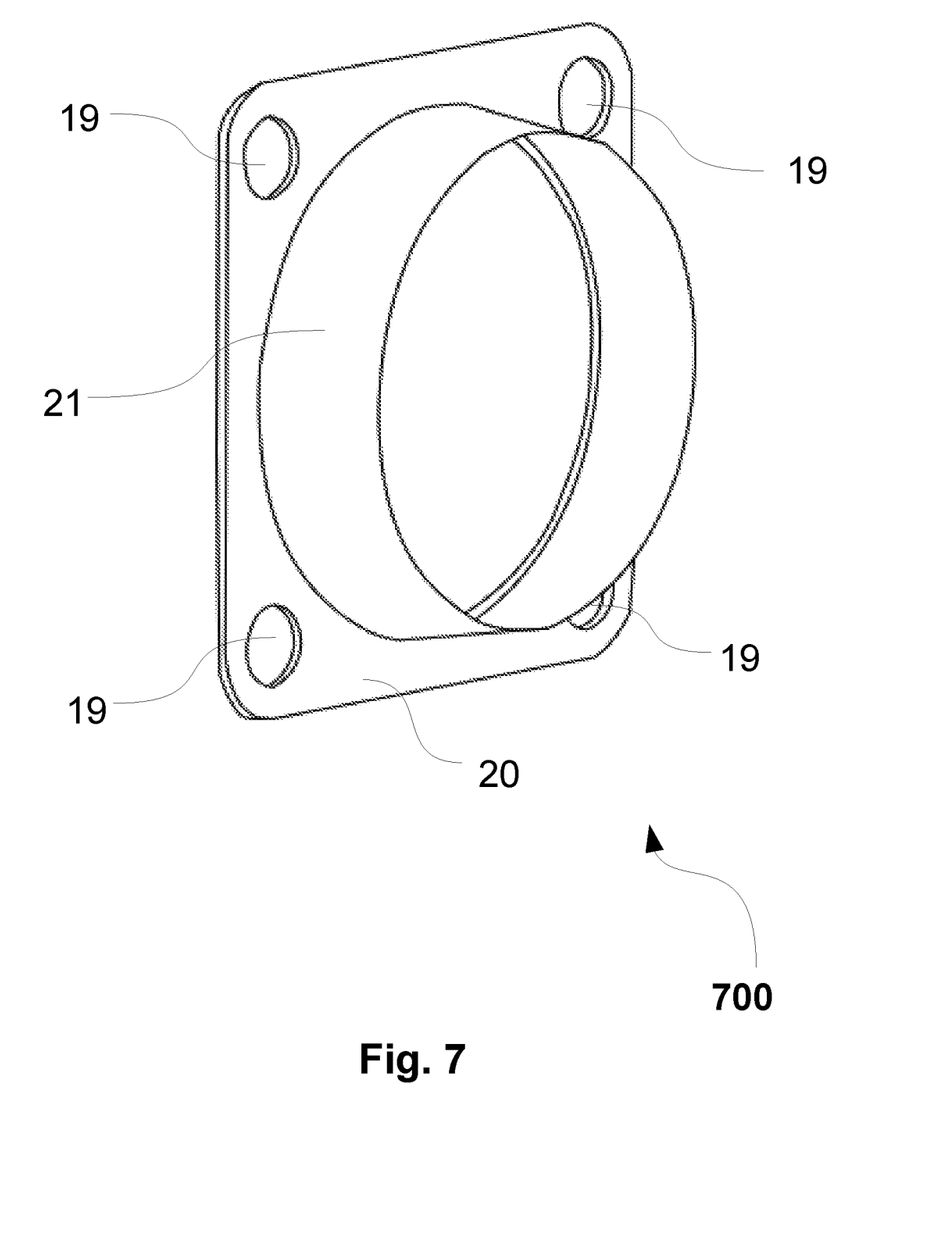
FIG. 7 shows another implementation of the cup member, according to an exemplary embodiment of the present invention.

FIG. 7 depicts another implementation of the cup member 700 for a 10"×2" electric trailer brake. This cup member 700 has a four-hole configuration that matches the brake mounting with mounting holes 19, a mounting plate 20, and a cup 21 that is shallower as the 10"×2" brake has less interior space but is intended to have the same protective effects as the 12"×2" electric trailer brake configuration.

Figure 8:
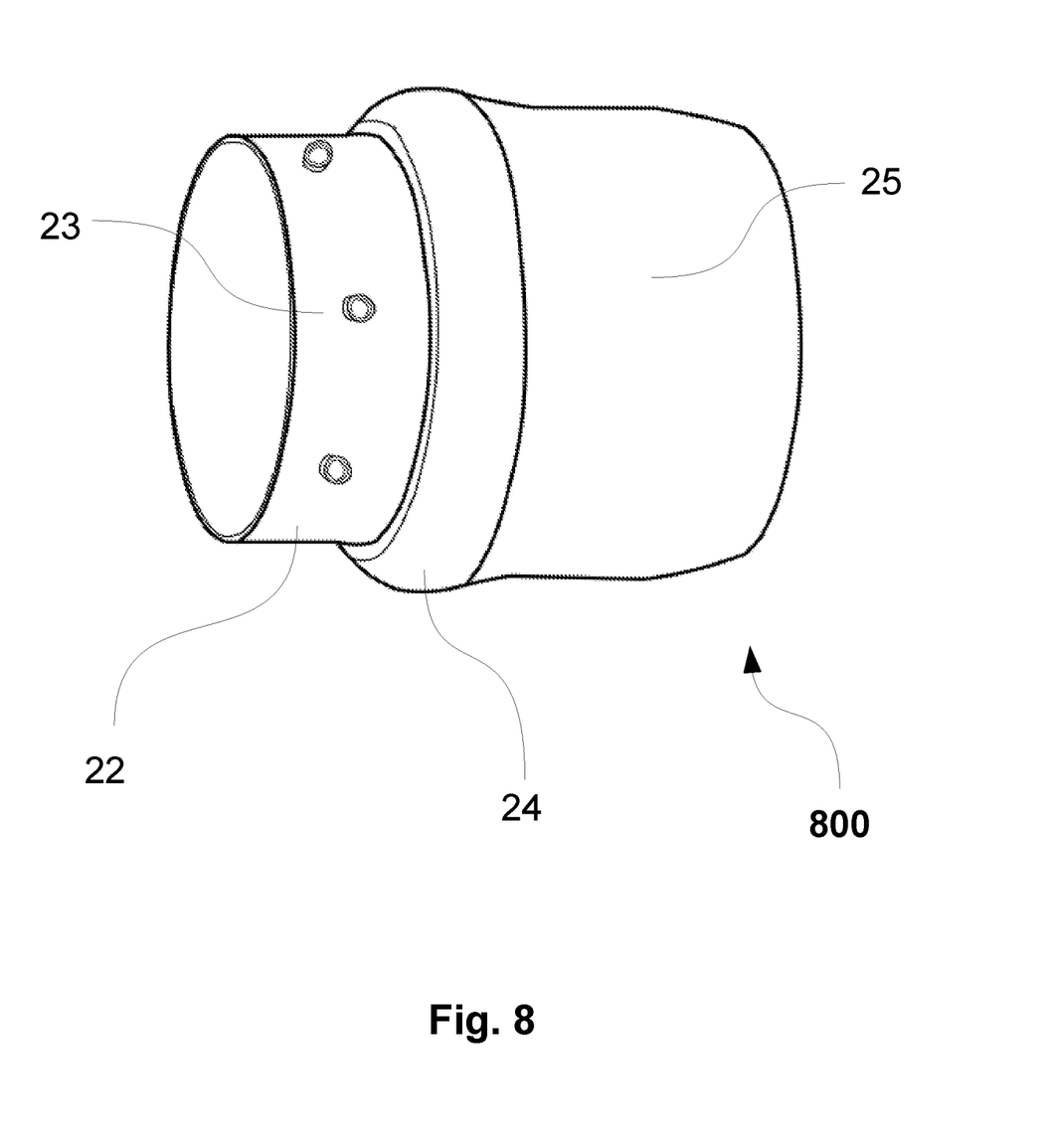
FIG. 8 shows another view of the cup for bigger brake assembly, according to an exemplary embodiment of the present invention.

FIG. 8 depicts another implementation of a cup member 800 that may be used in bigger brake assemblies where the cup attaches directly to the axle or spindle 30 via setscrews 31. Because of varying depths, spindle configurations, and axle material thickness, the cup 33 and the reservoir 32 may be bigger because of the amount of lubricant used in these larger drums, and the regular use of oil instead of grease in these assemblies. There are many varying axle spindle configurations on these bigger drums, some may or may not need a special seal to be protected. In some embodiments, the cup member and the seal member may be configured to fit larger trailer brake configurations such as, but not limited to, HD utility and flatbed, 5th wheel, gooseneck, commercial duty, or tractor trailer brakes.

Although the present invention has been illustrated and described herein with reference to preferred embodiments and specific examples thereof, it will be readily apparent to those of ordinary skill in the art that other embodiments and examples may perform similar functions and achieve like results. All such equivalent embodiments and examples are within the spirit and scope of the present invention, are contemplated thereby, and are intended to be covered by the patent claims.

What is claimed is:

1. A cup and seal system for a trailer brake assembly, the trailer brake assembly comprises a backing plate and a drum, the trailer brake assembly configured to mount over a plate of an axle and a spindle shaft, the cup and seal system comprises:
   a cup member comprising:
      a base plate, the base plate has stud holes, wherein position and number of the stud holes correspond to holes in the backing plate which correspond to studs in the plate of the axle, the base plate is hollow, and
      a conical frustum extends from an inner periphery of the base plate and upwards from a front face of the base plate; and
   a seal member comprising:
      a flange of a round, flat, and hollow profile,
      a skirt extends downwards from an outer periphery of the flange,
      a first grommet extends upwards from an inner periphery of the flange, and
      a second grommet extends downwards from the inner periphery of the flange,
      wherein the cup member is configured to be mounted to the backing plate, the seal member is configured to be mounted to the drum, wherein the first grommet is configured to be received within the conical frustum of the cup member when the drum is installed,
      wherein the seal member is configured to be rotated with the drum, wherein the first grommet is configured to rotate within the conical frustum without any contact with the cup member.

2. The cup and seal system according to claim 1, wherein the first grommet and the second grommet are integral forming a single continuous structure.

3. The cup and seal system according to claim 1, wherein the seal member further comprises: a garter spring configured to maintain a lip seal pressure against the spindle shaft.

4. The cup and seal system according to claim 1, wherein the first grommet and the second grommet are configured to channel a viscous liquid into the cup member.

5. The cup and seal system according to claim 4, wherein the cup member defines a reservoir for containing the thick liquid.

6. The cup and seal system according to claim 5, wherein the viscous liquid is lubricant.

7. A method for preventing brake failure, the method comprises:
   providing a cup and seal system for a trailer brake assembly, the trailer brake assembly comprises a backing plate and a drum, the trailer brake assembly configured to mount over a plate of an axle and a spindle shaft, the cup and seal system comprises:
   a cup member comprising:
      a base plate, the base plate has stud holes, wherein position and number of the stud holes corresponds to holes in the backing plate which corresponds to studs in the plate, the base plate is hollow, and
      a conical frustum extends from an inner periphery of the base plate and upwards from a front face of the base plate, and
   a seal member comprising:
      a flange of a round, flat, and hollow profile,
      a skirt extends downwards from an outer periphery of the flange,
      a first grommet extends upwards from an inner periphery of the flange, and
      a second grommet extends downwards from the inner periphery of the flange,
      wherein the cup member is configured to be mounted to the backing plate, the seal member is configured to be mounted to the drum, wherein the first grommet is configured to be received within the conical frustum of the cup member when the drum is installed, wherein the seal member is configured to be rotated with the drum, wherein the first grommet is configured to rotate within the conical frustum without any contact with the cup member; and installing the cup and seal system.

8. The method according to claim 7, wherein the first grommet and the second grommet are integral forming a single continuous structure.

9. The method according to claim 7, wherein the seal member further comprises:

a garter spring configured to maintain a lip seal pressure against the spindle shaft.

10. The method according to claim 7, wherein the first grommet and the second grommet are configured to channel a viscous liquid into the cup member.

11. The method according to claim 10, wherein the cup member defines a reservoir for containing the viscous liquid.

12. The method according to claim 11, wherein the viscous liquid is lubricant.

* * * * *